Patented Dec. 1, 1925.

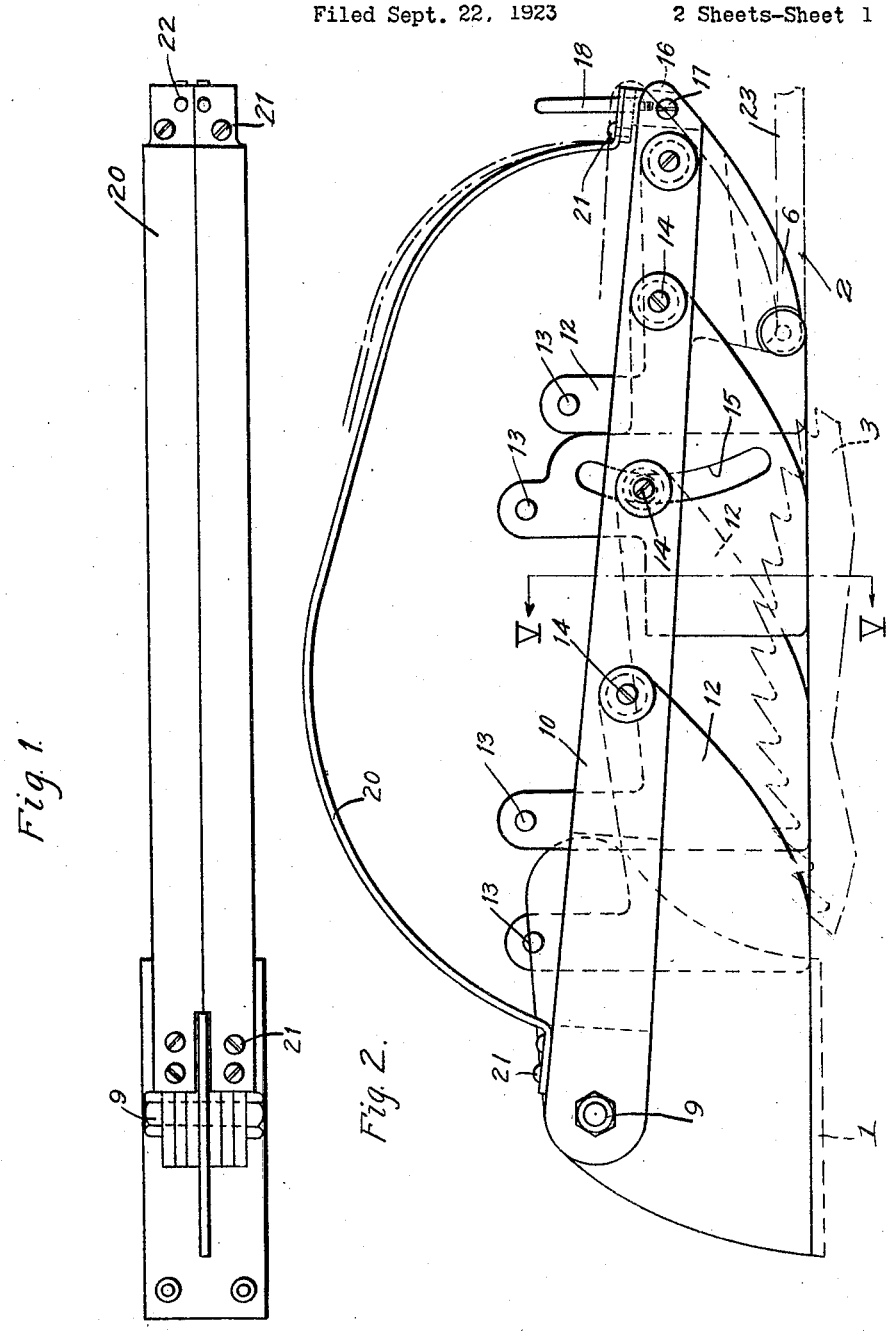

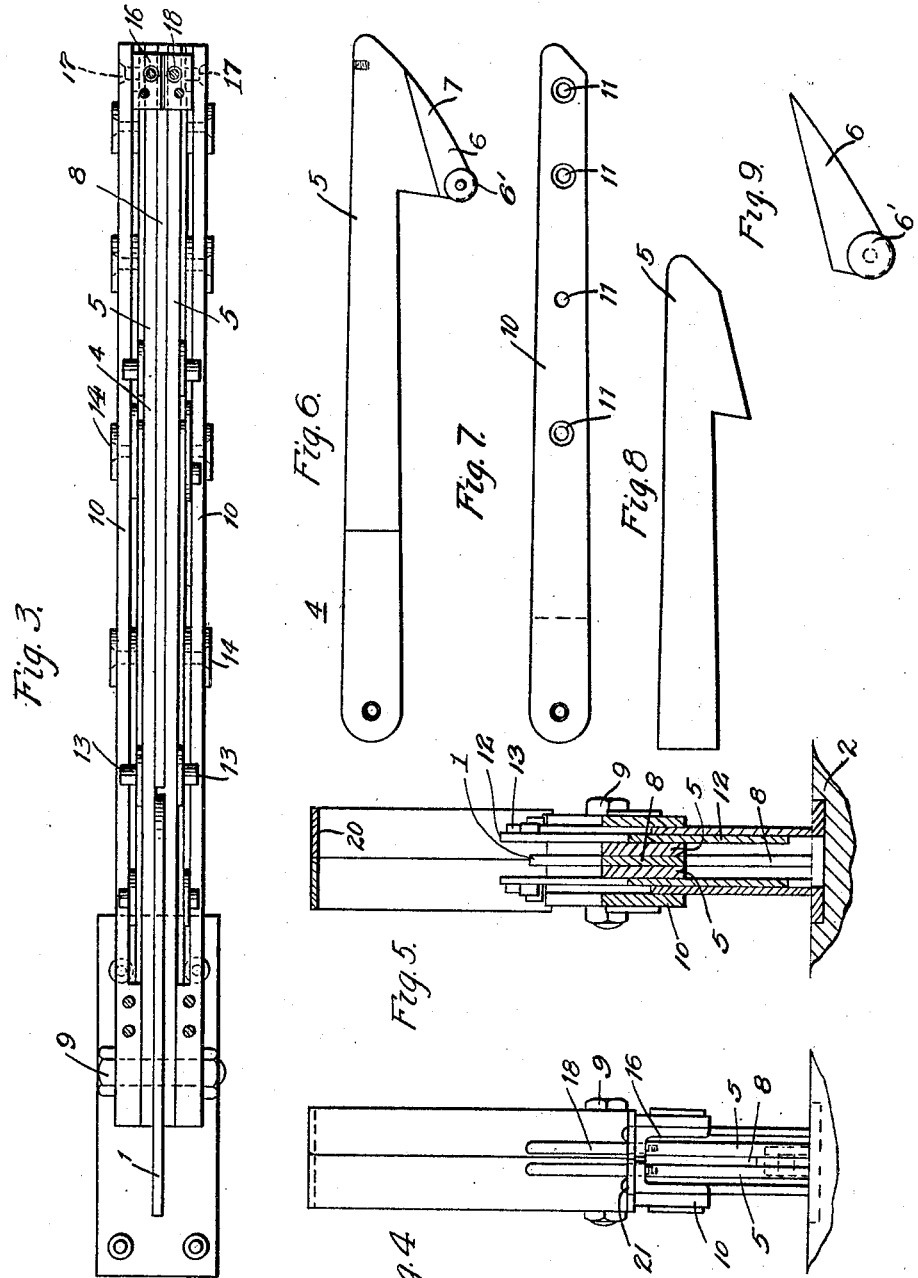

1,563,317

UNITED STATES PATENT OFFICE.

CARL B. AUEL, OF IRWIN, PENNSYLVANIA, ASSIGNOR TO WESTINGHOUSE ELECTRIC & MANUFACTURING COMPANY, A CORPORATION OF PENNSYLVANIA.

SAW GUARD.

Application filed September 22, 1923. Serial No. 664,241.

*To all whom it may concern:*

Be it known that I, CARL B. AUEL, a citizen of the United States, and a resident of Irwin, in the county of Westmoreland and State of Pennsylvania, have invented a new and useful Improvement in Saw Guards, of which the following is a specification.

My invention relates to saw guards, more especially to guards for circular saws which are adapted to be mounted on the kerf plate or splitter commonly associated with such saws.

It is among the objects of my invention to provide a saw guard which shall insure absolute safety for the operator and yet permit of freedom of cutting and handling the materials to be sawed in an expedient manner, and which shall be simple and inexpensive in its construction, and positive and reliable in its operation.

Heretofore, various types of saw guards have been employed with the object of enclosing the cutting edge of the saw without interfering with the free operation thereof. The forms and structures of such guards are of various designs, although their object has been commonly that of offering protection to the operator.

My present invention is directed to a saw guard which is of simple and inexpensive construction, being attached directly to the kerf plate or splitter of the saw without requiring supporting frames such as are ordinarily employed in devices of this character.

In the accompanying drawings constituting a part hereof and in which like reference characters designate like parts, Fig. 1 is a plan view of a saw guard embodying the principles of my invention, Fig. 2 is a side elevational view thereof showing the relative association of the several parts, Fig. 3 is a plan view with the upper guards removed, Fig. 4 is an end elevational view thereof, Fig. 5 is a cross-sectional view thereof taken along the line 5—5 of Fig. 2, Fig. 6 is a side elevational view of the center guard arm, Fig. 7 is a similar view of one of the outer guard arms and Figs. 8 and 9 are side elevational views of portions of the members utilized in the construction of the center arm of Fig. 6.

Referring to Fig. 2, the saw guard therein illustrated comprises a kerf or splitter plate 1 which is secured to a saw table represented by the line 2 having a circular saw 3 extending thereabove. The saw guard comprises a plurality of guard arms consisting of a center member 4 that is built up of a plurality of strips 5 and end portions 6, provided with a roller 6' (Fig. 2) to constitute a unitary member 7, Fig. 6. The purpose of this construction is to economize in the use of material so as to eliminate the waste which would ordinarily be removed from the strip to form the nose portion 6 and to permit securing a metal insert 8 between the members 5 for greater strength as the material used in the arm 4 is preferably a non-metallic substance such as fibre to provide a relatively light weight structure. The arm 4 is pivotally secured to the kerf plate by a suitable bolt 9 to allow movement thereof relative to the saw table 2.

A plurality of outer guard arms 10, (Figs. 2, 3 and 7), having a plurality of openings 11 are disposed outside of the arm 4 and pivoted to the kerf plate by the bolt 9 in the same manner as the center arm 4. The outer arms 10 are provided with a plurality of wing plates 12 having stop pins 13 adapted to rest on the upper edge of the outer arms, said wing plates being pivoted to the arms 10 by securing them with screws or bolts 14 extending through the openings 11. One of the wing plates 12 is provided with an angular slotted opening 15 that is adapted to engage the bolt 14, Fig. 3, which secures the adjacent plate 12. The outer ends of the arms 10 are provided with a pair of metal brackets 16 (see Fig. 4), that are secured thereto by screws 17 and are provided with a pair of vertical guide pins 18 the lower ends of which are secured in members 5. A pair of upper guards comprising metal straps 20 are secured to the outer arms 10 by screws or rivets 21 and to the brackets 16 in a similar manner. The straps 20 are provided at one end with openings 22 which are adapted to engage the vertical guide pins 18 to hold the outer arms 10 in cooperative alinement with the center guard arm 4.

The saw guard functions in the following manner: When in its inoperative or idle position, as shown in Fig. 2, the arms are slightly inclined with the roller 6' of the nose 6 touching the surface of the saw table 2 and the wing plates 12 likewise in engagement therewith. A board 23 to be split or cut is entered between the nose 6 of the center arm 4 and the surface of the table 2 thereby raising the saw guard without moving the wing plates 12 that are disposed on both sides of the circular saw 3. As the board 23 is advanced into the saw teeth, the wing plates 12 raise vertically and rest on the upper surface of the board thereby guarding that portion of the saw which may extend beyond the board. If it is desired to cut a very narrow strip, one of the outer arms 10 may be raised and swung back on its pivot point 9 to rest on the upper guards 20 which also limit the movement of the wing plates 12.

The purpose of the vertical guide pins 18 is to permit of sudden vertical movement of any one of the outer arms without effecting the co-operative engagement of the associated arm members, such movement being effected by knots or irregularities on the work to be cut.

It will be noted that the outer and inner members pivot about the bolt 9 on the kerf plate 1. The respective arms are not fixed or secured in any other manner except through their movable engagement at the pins 18 and openings 22, thus providing a structure that comprises a plurality of independently mounted parts that are adapted to function co-operatively. The guard functions efficiently to enclose the cutting saw during every stage of the cutting operation thus providing absolute safety to the operator.

It will be obvious from the above description of my invention that a saw guard made in accordance therewith provides a simple and inexpensive means for protecting circular saws to prevent harm to the operator and that such a design may be modified to make the structure applicable to any size or type of saw.

Although I have described a specific embodiment of my invention it will be obvious to those skilled in the art that various modifications may be made in the shape, size and manner of mounting the pivotal guards and in the proportions of the guard members without departing from the spirit of my invention.

I claim as my invention:—

1. A saw guard comprising a plurality of pivotal arms, the inner one of which is provided with a guide nose and the outer ones having wing plates pivotally mounted thereon, said outer arms being in co-operative engagement with the said inner arm.

2. A saw guard comprising a central support and guard arm having a rounded nose adapted to engage the work, a plurality of outer arms associated therewith, a plurality of pivotally mounted wing plates for said outer arms and a pair of upper guards secured to said outer arms.

3. A saw guard comprising a central support and guard arm having a roller adapted to engage the work, a plurality of outer arms associated therewith, a plurality of pivotally mounted wing plates for said outer arms and a pair of upper guards secured to said outer arms.

In testimony whereof, I have hereunto subscribed my name this 18th day of September 1923.

CARL B. AUEL.